United States Patent [19]

Smietanski

[11] Patent Number: 5,794,476
[45] Date of Patent: Aug. 18, 1998

[54] SELF-ALIGNING FLEXIBLE GEAR SUPPORT FOR AUXILIARY GEAR BOX

[75] Inventor: Richard A. Smietanski, Lockport, Ill.

[73] Assignee: Navistar International Transportation Corp., Chicago, Ill.

[21] Appl. No.: 735,480

[22] Filed: Oct. 23, 1996

[51] Int. Cl.⁶ .................... F16H 57/02; F16H 37/00; B65D 61/00
[52] U.S. Cl. .................... 74/15.63; 29/418; 74/606 R; 403/12; 277/9.5
[58] Field of Search .................... 74/15.63, 606 R; 29/418; 403/11, 12; 277/9.5

[56] References Cited

U.S. PATENT DOCUMENTS 3,004,438  10/1961  Funk et al. .................... 74/15.63
4,103,901  8/1978  Ditcher .................... 277/9.5
4,898,040  2/1990  Tamba et al. .................... 74/15.63

Primary Examiner—Allan D. Herrmann
Attorney, Agent, or Firm—Dennis K. Sullivan

[57] ABSTRACT

A flexible gear support for a PTO gear box for an internal combustion engine is a relatively inexpensive unitary structure comprising two concentrically spaced rings which are engaged together by a flexible web extending therebetween. The gear support replaces very expensive ball bearings of precise tolerance which support a main input gear of the PTO unit during assembly and testing thereof. Further, a ring shipping spacer may be used with the gear support, if desired, to accommodate any shock loads during shipping and handling should the particular gear support be of a spring rate insufficient to accommodate such shocks.

8 Claims, 6 Drawing Sheets

SELF-ALIGNING FLEXIBLE GEAR SUPPORT FOR AUXILIARY GEAR BOX

BACKGROUND OF THE INVENTION

The invention presented herein is an inexpensive self-aligning flexible gear support for temporarily supporting a main or input gear (or a flexible shaft therefrom) of an auxiliary gear box, such as a power take off (PTO), which support has previously been accomplished through use of an expensive bearing requiring special tolerances.

THE PRIOR ART

Typically in the prior art, such as disclosed in Fig.1, the PTO is driven by a large main or input gear within the PTO assembly. The main gear is rigidly bolted to a rear flange of an engine crankshaft and drives the remaining gear train internal to the PTO assembly. For ease in assembling the PTO, the main gear is positioned in proper relation to the remaining gear train by placement of a large ball bearing before and behind the main gear. In the PTO illustrated, the large ball bearings, made of steel, are of stringent tolerances and are retained in an aluminum housing while using tolerance rings to maintain the press fit to accommodate differences in thermal expansion of steel and aluminum. To prevent fretting of the tolerance rings into the aluminum of the housing, a steel wear ring was positioned around the outer surface of the tolerance ring.

The main gear bearings are only needed for supporting one end of a stub shaft of a test stand which drives the PTO during testing of the PTO and to support the main gear against gear loads developed in the PTO itself under test load.

After testing, the PTO is then engaged to the engine with the main gear rigidly attached to the crankshaft rear flange. Since the crankshaft is supported by the main bearings of the engine, the large ball bearings supporting the main gear in the PTO assembly must be of loose radial tolerances to allow the crankshaft remain supported on the engine main bearings. The PTO main gear bearings thus become extraneous once the main or input gear is connected to the crankshaft because the bearings of the crankshaft become the support for the input gear.

SUMMARY OF THE INVENTION

Accordingly, a primary object of the invention described and claimed herein is to replace the main gear bearings, tolerance rings, and wear rings of an auxiliary gear box for an engine with a simpler, less expensive support structure.

This object, as well as others, is specifically accomplished in an auxiliary gear box having a main input gear supported by a unitary flexible gear support of the present invention which is molded of a self-lubricating polymer, such as nylon. The gear support includes an outer ring, the outer diameter of which simulates the outer diameter of the bearing it replaces, and an inner ring nested within the outer ring, the inner diameter of the inner ring simulating the inner diameter of the bearing. Between the inner and outer rings is an integrally molded flexible web or membrane. The gear support provides the support functions described above during testing.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
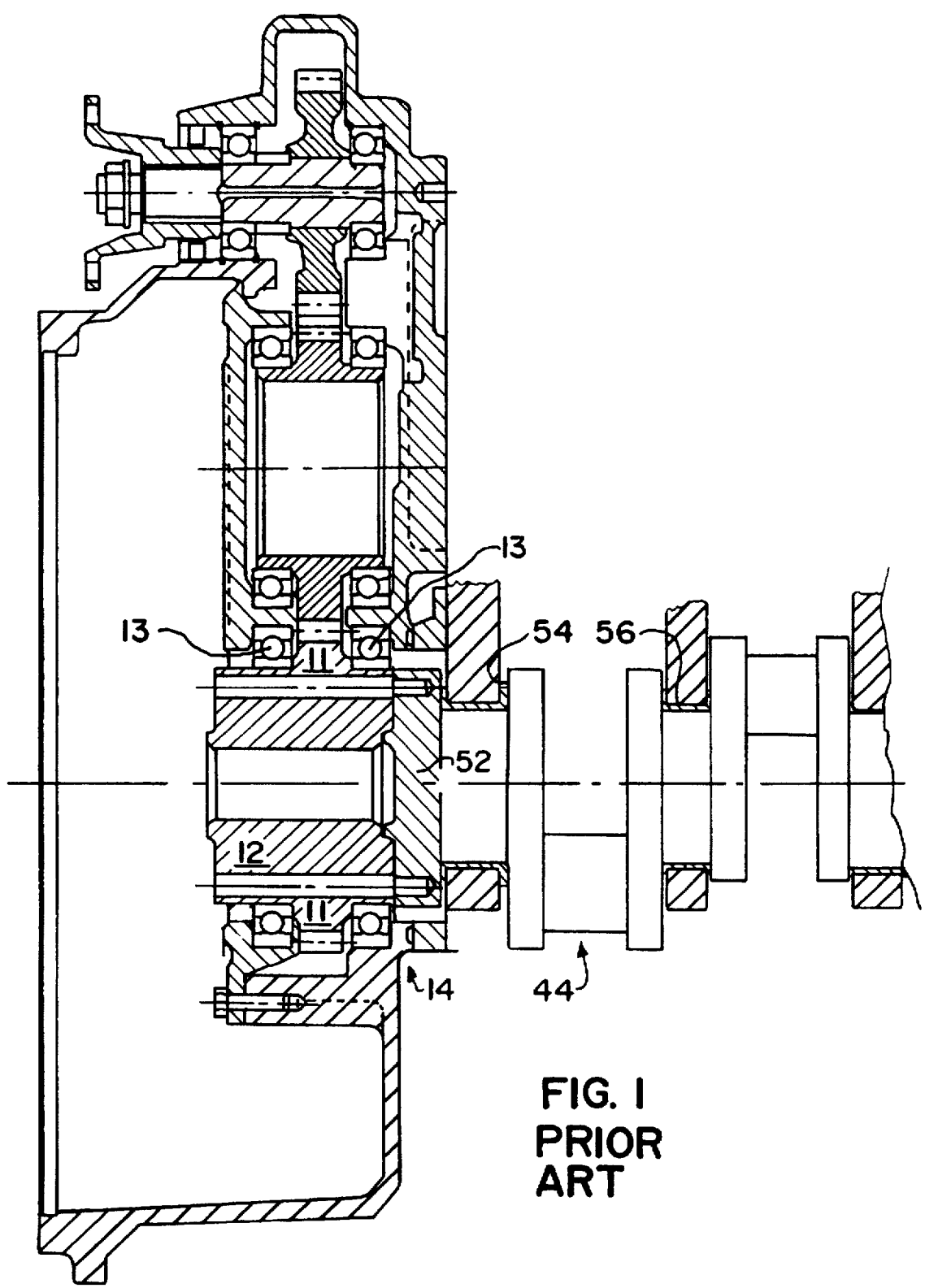
FIG. 1 is a cross section through a prior art PTO as assembled to an engine with the main gear attached to a crankshaft thereof.

Referring now to the drawings in greater detail, there is illustrated in FIG. 1 a prior art embodiment of an engine-mounted power take off (PTO) unit 14 having a main or input gear 12. The main gear 12 is positioned to drive the remaining gear train of the PTO unit and, during assembly, required positioning of the main gear relative to the remaining gear train must be maintained. As shown, large ball bearings 13 are placed to either side of drive spur 11 of main gear 12 the bearings necessarily being nested within a tolerance ring which itself is nested within a hardened steel wear ring for reasons defined hereinabove.

The PTO main gear 12 is bolted rigidly to the rear flange 52 of the crankshaft 49. The crankshaft 44 is supported by main engine bearings 54, 56, which also support the PTO main gear. The ball bearings 13 of the PTO must be of a precise configuration providing loose radial tolerances to allow the engine main bearings 54, 56, to support the crankshaft. However, this precision in the configuration of the bearings makes them very expensive and, once the PTO unit is assembled to the engine, useless.

Figure 2:
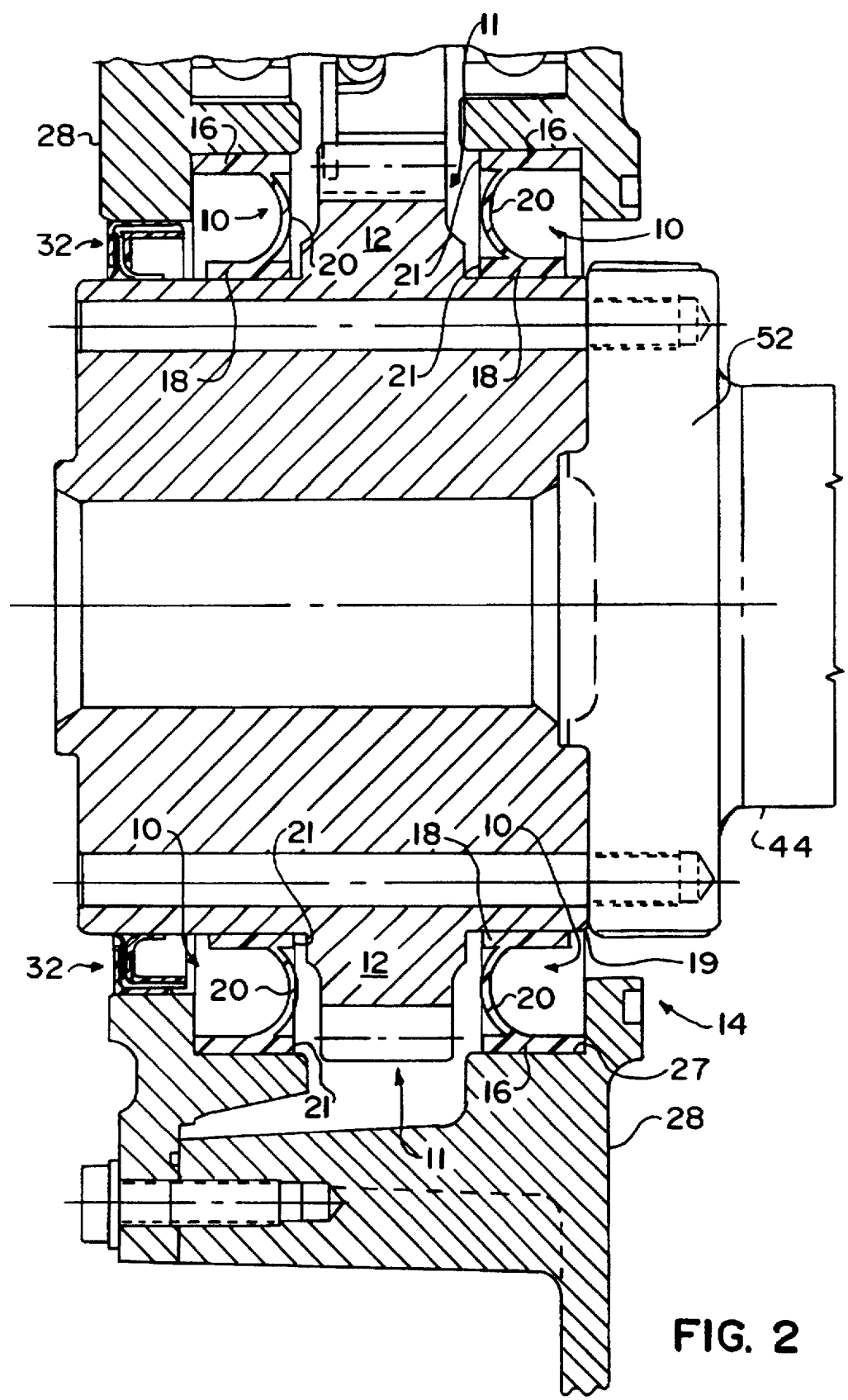
FIG. 2 is an enlarged cross-section of a PTO illustrating the main or input gear showing the gear support of the invention.

In FIG. 2, a gear support 10 made in accordance with the teachings of the present invention is shown positioned in place of the ball bearings of the prior art, one to either side of drive spur 11 of a main gear 12 of the PTO assembly, generally identified as 14. The gear support 10 will be shown in full detail hereinafter.

It can be deduced from the cross-section shown here that the gear support 10 is a circular unitary element molded from a self-lubricating polymer, such as nylon, and comprises two nested rings 16 and 18 which are joined together by an integrally molded web or membrane 20. The outer ring 16 has an outer diameter approximating the outer diameter of the bearing it replaces so that it fits within the inner periphery 27 of the PTO housing 28. The inner ring 18 has an inner diameter which approximates the inner diameter of the replaced bearing so that it fits about the outer periphery 19 of main gear 12. The width and thickness of the rings 16 and 18 may be varied to create the best possible interfacing with mating components. However, it will be seen that one of the axial edges 21 of each ring 16 and 18 are aligned, with the web 20 being positioned at a location toward the aligned edges 21.

The membrane 20 may be of any practical and easily molded cross-section providing flexibility including, but not limited to semicircular, elliptical, S-shaped, parabolic, hyperbolic, sinusoidal, or of any other description of a curve or a straight line. The membrane 20 may be defined by a single or by multiple elements. Any portion of the rings 16, 18, and web or membrane 20, may be provided with lubrication feed/draw ports or vent ports (not shown) to facilitate lubrication of the PTO gears and bearings.

Figure 3:
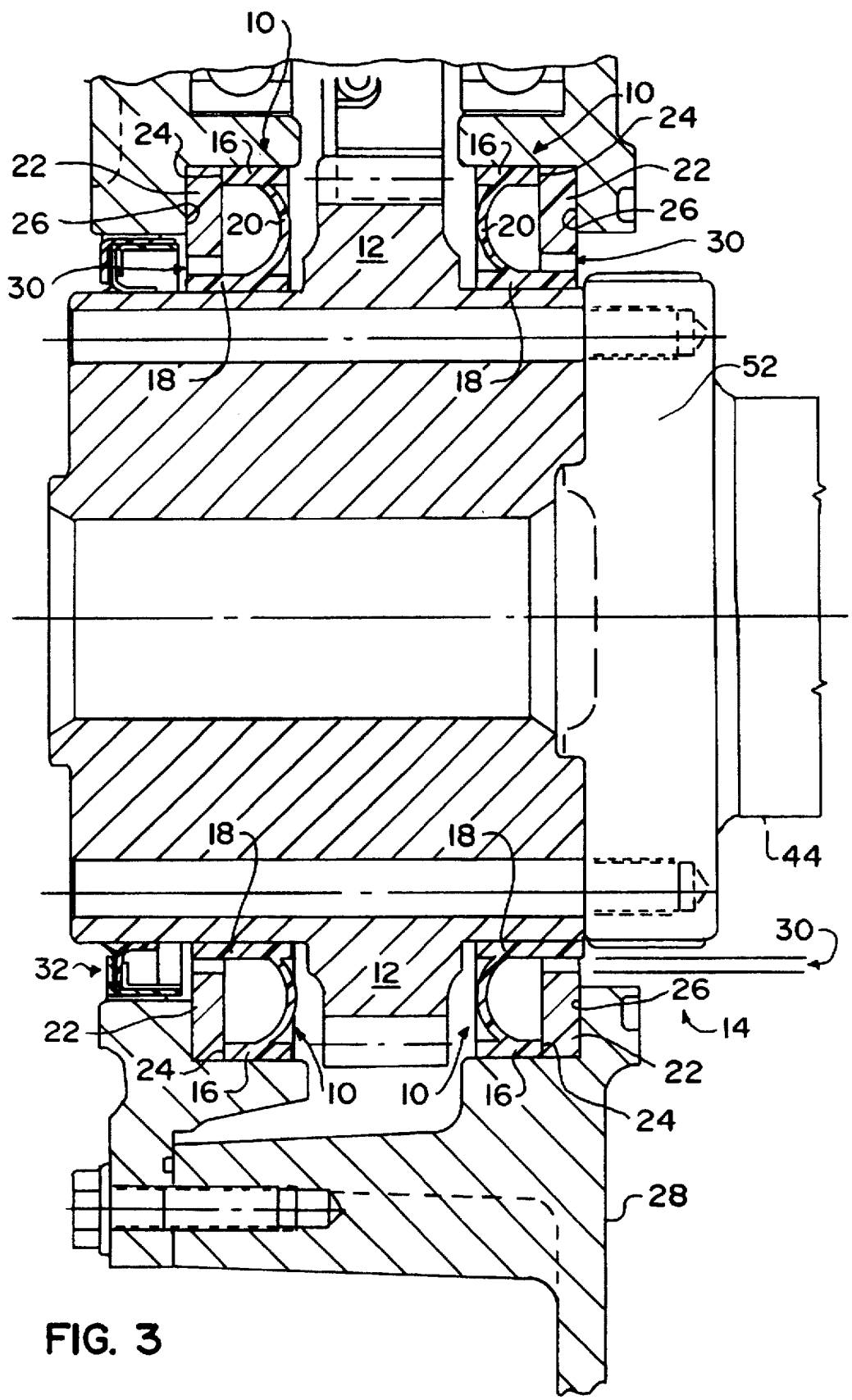
FIG. 3 is a view similar to FIG. 2. but further showing an auxiliary shipping spacer in combination with each gear support.

Turning to FIG. 3, it will be seen that the outer ring 18 has been narrowed to allow for placement of an auxiliary shipping ring spacer 22, the spacer 22 being snugged into and held in position by functional engagement of a free end 24 of the outer ring 18 thereagainst, the opposite side of the spacer 22 bearing against a radially inwardly extending wall portion 26 of the PTO housing 28. This spacer 22 is proposed for use where limiting of total radial deflection is critical. For instance, if the spring load produced by a particular web 20 design of the gear support 10 is found to be less than required to support the PTO input gear 12 during shipping/handling in a manner to ensure a lubricating oil seal 32 is not damaged, then the spacer 22 would be incorporated, primarily to accommodate shock loads during shipping/handling. It is critical that the inner radial extent of the spacer 22 falls short of contact with the inner ring 16, creating a clearance 30. This area of clearance 30 between the inner ring 16 and the spacer 22, is sized to accommodate more than the maximum expected radial excursion of the PTO input gear 12 during its useful life and less than the degree of radial deflection of the input gear 12 which could be safely sustained by the lubricating oil seal 32 without destroying same. The spacer 22 may be made of any suitable material and, if desired, include holes or grooves to allow for venting and oil flow.

Figure 4:
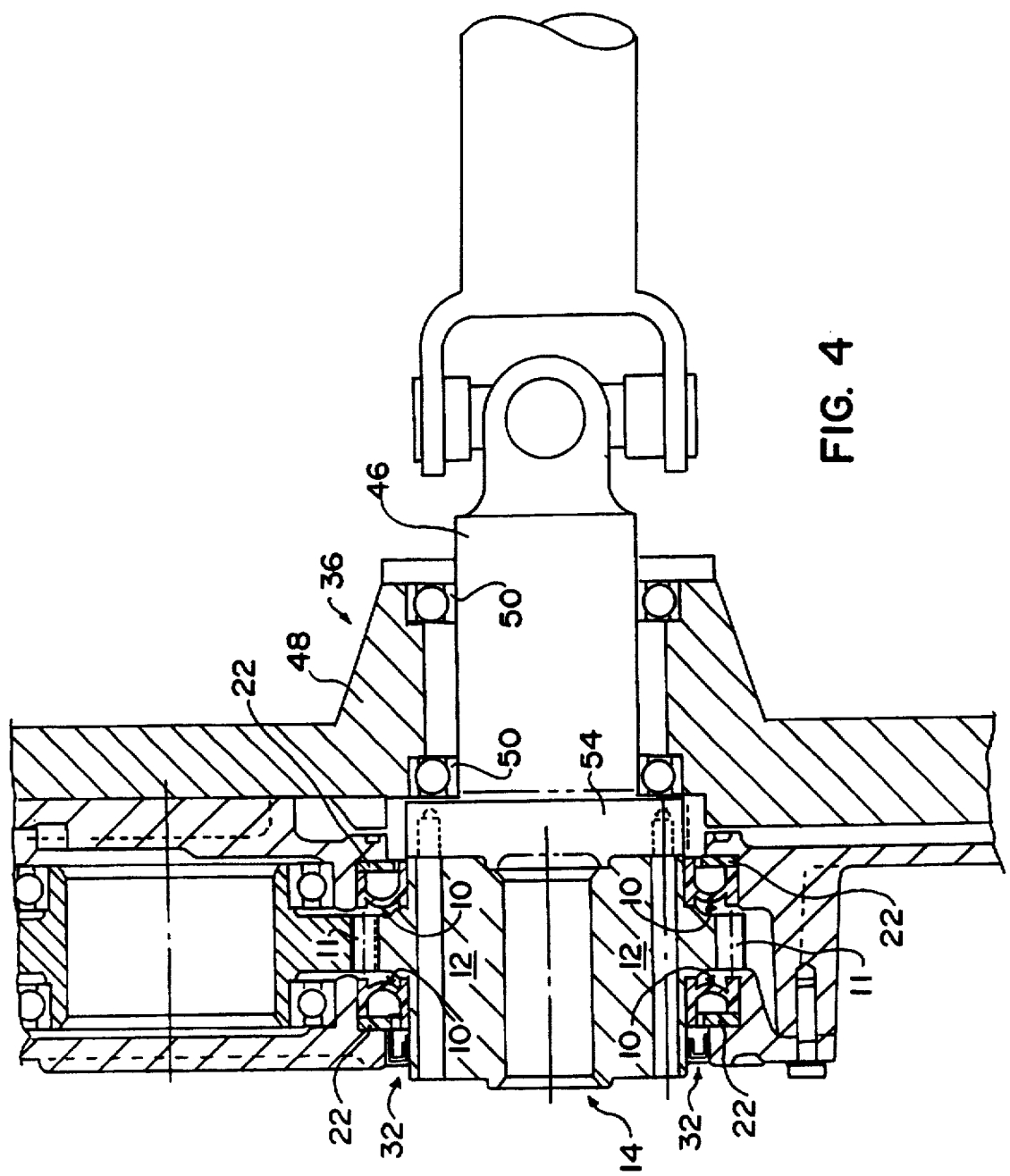
FIG. 4 is a cross-section of the PTO of FIG. 2 shown engaged to a test stand.

In FIG. 4 it will be seen that a modification has been made to a fixture 36 of a test stand (not shown), the fixture 36 mimics the configuration of a rear end 42 of an engine 43 and a crankshaft 44 (FIG. 5) to which the PTO assembly 14 attaches.

The fixture 36 includes an elongated driven stub shaft 46 which is supported within a collar 48. Within the collar 48 the stub shaft 46 is supported by two bearings 50 which maintain relative rotational position between the stub shaft 46 and the PTO input gear 12.

The disclosed modification allows mounting of the PTO assembly 14 to the fixture 36 in a fashion identical to that in which the tested PTO assembly 14 will be engaged during its useful life, mounted to the rear end 42 of an engine 43 and having the PTO input gear 12 thereof bolted to a rear flange 52 of the crankshaft 44.

The stub shaft 46 includes an end flange 54 identical to the rear flange 52 of the crankshaft 44, with the PTO input gear 12 bolting directly to this flange 52.

The stub shaft 46 requires only one pair of inexpensive ball bearings 50, which would be of common tolerance, as opposed to special tolerance bearings previously required in the PTO assembly 14.

Also, any testing loads developed during testing of PTO assembly 14 would now be carried by the stub shaft 46 and its bearings 50 such that essentially no load is carried by the gear supports 10.

Figure 5:
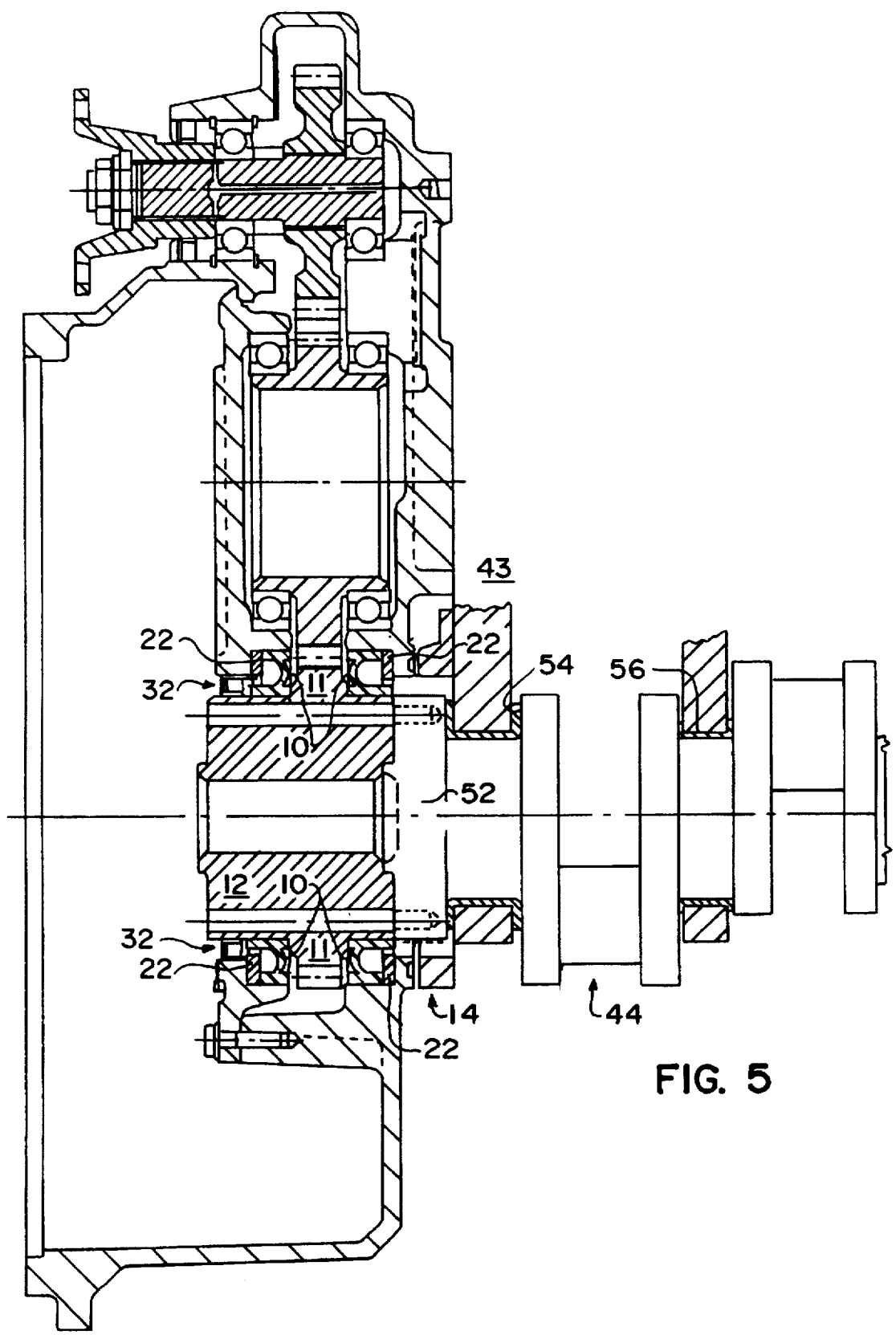
FIG. 5 is a cross-section of the PTO of FIG. 3 shown engaged to an engine.

FIG. 5 shows the PTO main or input gear 12 bolted rigidly to the rear flange 52 of the crankshaft 44, creating an extension thereof. The crankshaft 44 is mounted in the engine by a conventional rear main journal bearing 54, and intermediate bearings, one being shown at 56. Once the PTO assembly 14 is appropriately engaged to the engine 43, the crankshaft 44 supports any loads created during use. Thus, any type of support for the PTO main gear 12 becomes unnecessary, including the support provided by the gear supports 10. Thus, it is logical to desire inexpensive structure, such as the gear support 10, rather than extremely expensive structure, such as special tolerance bearings previously used, inasmuch as they become of no use once the PTO assembly 14 is engaged for use as described above.

Further, it will be understood that any attempt to locate the PTO main gear 12 in a positive or fixed manner will, in fact, be detrimental to the operation of the engine, fighting the functional purpose of the crankshaft bearings (54, 56), possibly causing premature failure thereof.

Figure 6:
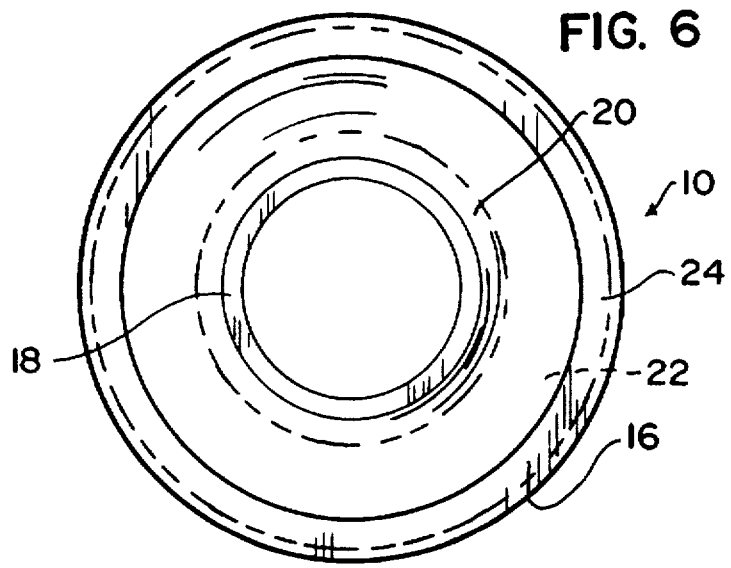
FIG. 6 is an axial view of a gear support of the invention, a shipping spacer being shown in phantom in place over the outer ring.
Figure 7:
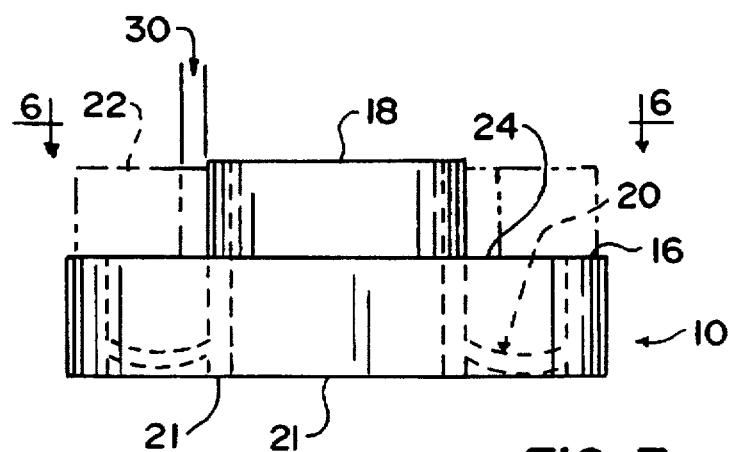
FIG. 7 is a side view of the gear support, a portion of an auxiliary shipping ring spacer shown in phantom.
Figure 8:
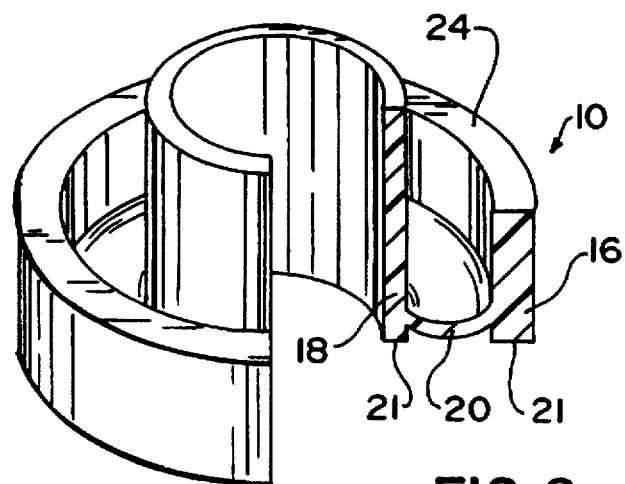
FIG. 8 is a perspective view of the gear support with a quarter section thereof broken away.

FIGS. 6–8 show the structure of the gear support 10 disclosed herein. As illustrated, the gear support 10 is a toroidal unitary structure, somewhat reminiscent of a mushroom, having the outer ring 16 concentrically disposed about the inner ring 18, the rings 16 and 18 being connected together by at least one web 20 of material, preferably being positioned toward the aligned ends 21 of the rings 16 and 18.

Although shown with the inner ring 18 of greater axial length than the outer ring 16, it will be understood that the rings could be of equal axial extent in circumstances where no spacer 22 is required. A portion of a spacer 22 is shown in phantom in FIGS. 6 and 7, showing no contact between the spacer 22 and the inner ring 18, to create the required clearance 30 therebetween.

As described above, the gear support 10 of the present invention provides a number of advantages, with or without use of the auxiliary ring spacer 22, some of which have been described above and others of which are inherent in the structures. Further, modifications may be proposed without departing from the teachings herein. Accordingly the scope of the invention is only to be limited as necessitated by the accompanying claims.

What is claimed is:

1. In combination with an auxiliary gear box for an internal combustion engine having a crankshaft, the gear box having a main gear adapted to be attached to said crankshaft, a flexible gear support for maintaining the position of the main gear in the gear box prior to assembly on said engine comprising a unitary structure mounted in a fixed position within said gear box and having a pair of concentrically spaced inner and outer rings and a flexible web extending between said rings, said inner ring having an inner periphery disposed in supporting relation to said main gear.

2. The structure of claim 1 wherein one axial edge of each ring is aligned with one axial edge of the other, said web being offset from a central axial position between the respective axial edges toward a position adjacent the aligned edges of the rings.

3. The structure of claim 2 wherein a second axial edges of each ring are also in alignment.

4. In combination with an auxiliary gear box, the gear box having a main gear, a flexible gear support mounted within said gear box and comprising an inner ring and an outer ring, the rings being concentrically spaced and held together by a web extending radially between the rings, the web being made of slightly compressible material, and the inner ring having an inner periphery for rotatably supporting said main gear.

5. The gear support of claim 4 wherein one axial edge of each ring is aligned with one axial edge of the other.

6. The gear support of claim 5 wherein a second axial edge of the inner ring extends significantly past a second axial edge of the outer ring.

7. The gear support of claim 6 further including a shipping ring which seats against the second axial edge of the outer ring and extends radially inward to a point short of contacting the inner ring, creating a clearance therebetween.

8. An internal combustion engine comprising:

a crankcase;

a crankshaft mounted by crankshaft bearings to said crankcase;

a power take off gear box having a housing fixedly engaged to a rear end of the crankcase;

a gear train within said housing including a main gear attached to said crankshaft, said crankshaft bearings providing rotational support for the main gear; and a pair of flexible gear supports for maintaining the position of the main gear in the PTO gear box prior to assembly thereof on said engine, each of said flexible gear supports having concentrically spaced inner and outer rings joined together by a web of slight compressibility, a gear support being placed in rotationally supporting relationship to each axial side of a drive spur of said main gear to support the main gear during testing and shipping, said gear supports being sufficiently flexible that said gear supports do not provide a significant support function upon said main gear being attached to said crankshaft.

* * * * *